United States Patent
Meinzer

(10) Patent No.: US 6,401,465 B1
(45) Date of Patent: Jun. 11, 2002

(54) ABSORPTION CHILLER LEAK DETECTION AND LOCATION AND CHECKING HYDROGEN REMOVING CELLS

(75) Inventor: Richard A. Meinzer, Glastonbury, CT (US)

(73) Assignee: Carrier Corporation, Farmington, CT (US)

( * ) Notice: Subject to any disclaimer, the term of this patent is extended or adjusted under 35 U.S.C. 154(b) by 0 days.

(21) Appl. No.: 09/692,082

(22) Filed: Oct. 19, 2000

(51) Int. Cl.[7] .......................... F25B 47/00; G01K 13/00
(52) U.S. Cl. .................. 62/85; 62/129; 62/141; 62/476; 62/494; 73/40.7
(58) Field of Search ................ 62/476, 484, 490, 62/494, 298, 141, 142, 129, 85, 485; 73/40.7, 19.02, 19.12; 422/98; 96/4, 7, 9

(56) References Cited

U.S. PATENT DOCUMENTS

| | | | |
|---|---|---|---|
| 3,867,631 A | * | 2/1975 | Briggs et al. |
| 4,419,882 A | * | 12/1983 | Ishii et al. .................. 73/40.7 |
| 4,768,371 A | * | 9/1988 | Joshi ........................ 73/40.7 |
| 4,918,975 A | * | 4/1990 | Voss ........................ 73/40.7 |
| 5,022,265 A | * | 6/1991 | Voss ........................ 73/40.7 |
| 5,031,410 A | * | 7/1991 | Plzak et al. ................... 62/85 |
| 5,398,543 A | * | 3/1995 | Fukushima et al. ......... 73/40.7 |
| 5,636,526 A | * | 6/1997 | Plzak et al. ............. 62/476 X |
| 5,728,929 A | * | 3/1998 | Gevaud .................. 73/40.7 X |
| 6,014,892 A | * | 1/2000 | Baret et al. ................. 73/40.7 |

* cited by examiner

Primary Examiner—Chen-Wen Jiang

(57) ABSTRACT

A hydrogen sensor (33) protected from water vapor by a membrane (35) indicates increases in hydrogen concentrations which are indicative of a leak in an absorption chiller (13). A helium detector (43), protected from water vapor and liquid water by a membrane (44) and a vapor trap (46), senses the presence of helium from a spray (40) to locate the position of leaks. A hydrogen removing cell (47) is tested by monitoring the variation with time of the hydrogen concentration before and after the cell is rendered inoperative.

11 Claims, 1 Drawing Sheet

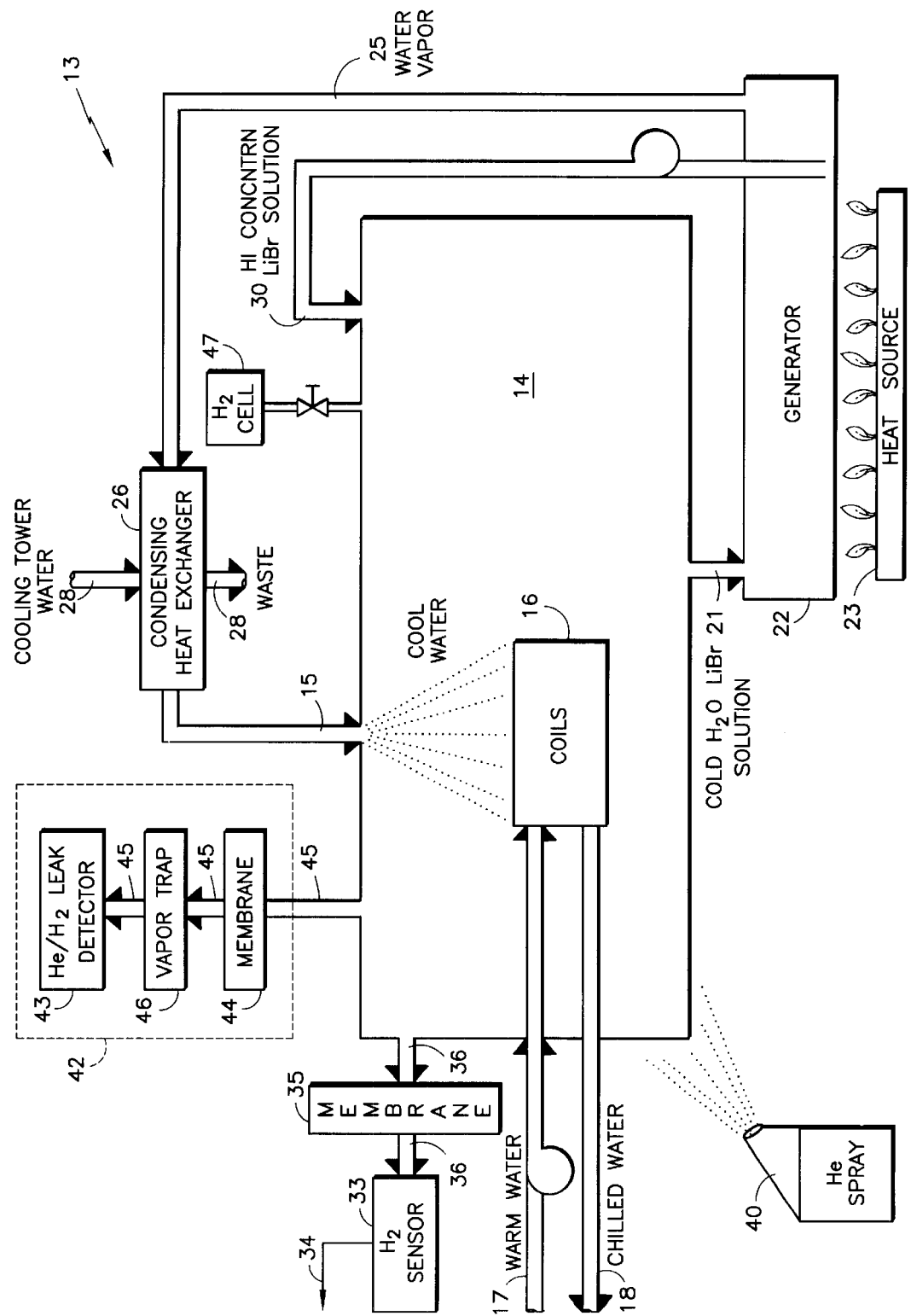

ABSORPTION CHILLER LEAK DETECTION AND LOCATION AND CHECKING HYDROGEN REMOVING CELLS

TECHNICAL FIELD

This invention relates to detecting the occurrence and specific location of leaks and checking hydrogen removing cells in absorption chillers.

BACKGROUND ART

Absorption chillers have found great favor because they are quite compatible with the environment, and do not use electricity to drive the cooling process, but rather utilize heat which may, in many instances, be waste heat from other processes, which further favors the environment. Absorption chillers are utilized in various sizes, but typically are quite large, ranging from three to five meters in diameter and eight to fifteen meters in length, for instance. Because of this, and because of the fact that the operating pressure of an absorption chiller is less than about six torr, there is a great opportunity for leakage to occur. Atmospheric air (about 760 torr) will enter the chiller through the leaks. The absorption chillers utilize lithium bromide in solution with water. In one phase of the process, the lithium bromide is very concentrated and hot, and extremely corrosive. When air enters through leaks, the oxygen in the air supports the corrosion of the metal parts. Further, the large fraction of nitrogen in the air impedes the absorption of water vapor into the lithium bromide solution, thereby significantly reducing the effectiveness of the chiller process.

When air enters the chiller and accelerates corrosion of the metal parts, metal ions dissolving into the aqueous /LiBr solution release hydrogen, and the $H_2$ impedes the absorption of water vapor by the lithium bromide solutions, thereby denigrating chiller performance. It is therefore conventional to utilize hot palladium cells to extricate the hydrogen. However, there is no way to determine from outside the chiller whether the palladium cells are working, or not.

In the prior art, the occurrence of a leak is usually detected by observation of severely reduced chiller performance. This becomes a major event in large buildings, particularly hospitals, when the building environment can no longer be controlled because of chiller shut-down, due to the leaks. Thereafter, determining the location of the leak is a separate and lengthy process. One method which has been used in the past is to spray Freon all over the outside of the chiller, one area at a time, so that Freon will enter the chiller when sprayed near the leak, and the presence of Freon within the chiller is sensed by a Freon sensor attached through the wall of the chiller. However, this process is not very effective. Another process used in the prior art is to pressurize the interior of the chiller with Freon to more than atmospheric pressure, and utilize portable Freon detectors, moved all over the exterior surfaces, to sense where Freon exits the chiller, thereby identifying the location of the leak. This process requires that the chiller be shut down for three or four days, which is excessive.

In this process the chiller is filled with pure nitrogen instead of air because the oxygen in air would increase the rapid oxidation (corrosion) of the internal metal surfaces. Most of the lithium bromide and water vapor are removed first. Then a nitrogen mixture with a small amount of ordinary refrigerant (such as 134A, for instance) is utilized to pressurize the chiller above atmospheric pressure. A refrigerant detector is utilized, being moved over the entire external surface of the chiller, to locate the leak. Subsequently, the nitrogen/refrigerant mixture has to be pumped out of the chiller, completely, since the presence of even traces of nitrogen or other extraneous gas, even at only a few millitorr pressure will denigrate chiller performance.

With the Freon detection process, the sensitivity of the leak detection process is set by the detector's ability to detect Freon. Since chloro-Freons can no longer be dumped into the atmosphere, only fluoro-Freons like 134A can now be used. These Freons cannot be detected at the low concentrations with low-cost sensors where chloro-Freon could be detected using relatively low-cost sensors. Expensive sensors using mass spectrometry principles operate at low pressure but cannot operate in the presence of water vapor. Furthermore, greater leak sensitivity can be achieve by using low molecular weight molecules because the rate at which a molecule diffuses through a leak varies with the square root of the molecular weight. Therefore, under similar conditions, helium (He) will diffuse through a leak about five times faster than a Freon like 134A.

DISCLOSURE OF INVENTION

Objects of the present invention include an on-line absorption chiller leak detector that operates continuously, without human intervention; an absorption chiller leak detector that can detect leaks prior to significant deterioration of chiller operation, thereby permitting corrective action to be taken without the chiller having failed or being required to be shut down; absorption chiller leak location which can be performed while the chiller is operating; absorption chiller leak location which does not require shutting down the chiller; absorption chiller leak location which does not require insertion and/or removal of substances which are incompatible with chiller operation; absorption chiller leak location which is extremely inexpensive and very effective; absorption chiller leak location which is very fast, not requiring multiple days; absorption chiller leak detection and location which promotes continuous operation of the chiller during the detection and location processes; and checking hydrogen removing cells in an absorption chiller.

According to the present invention, an on-line, un-manned absorption chiller leak detector comprises a low-cost hydrogen sensor, such as a palladium-silver solid state sensor or a palladium micro-cantilever (known as a Micro Electrical Mechanical System, or MEMS), with accommodation for water vapor. In one form of the invention, the sensitivity of the hydrogen detector to water vapor is compensated for in the signal processing; in another form of the invention, water vapor is prevented from reaching the sensor by virtue of a membrane that passes light gases and blocks the transmission of water vapor.

In accordance further with the invention, the location of leaks in an absorption chiller is achieved by spraying helium at all necessary specific locations on the exterior of the chiller, and sensing the movement of helium into and through the interior of the chiller by means of a conventional helium leak detector which is modified by blocking water vapor therefrom, the water vapor being blocked by either or both of a membrane that will pass the light gases but not water vapor, and/or a water vapor trap (such as a condenser).

The present invention provides a means for early detection of chiller leaks, without human intervention. The invention permits leak location without shutting down the chiller, without emptying it and repressurizing it with a leak detection gas, and without purging the leak detection gas. The present invention permits sensing leaks which are much smaller than the leaks that were capable of being detected by the use of Freon sprays, such as ten to 1000 times smaller leaks. Furthermore, the present invention, utilizing helium as the detectable entry substance, is very fast, sensing the presence of induced helium within seven to ten seconds, in most cases, making it relatively easy to retrospectively locate the leak precisely.

In further accord with the invention, hydrogen concentrations may be monitored to determine the efficacy of hydrogen-removing, hot palladium cells.

Other objects, features and advantages of the present invention will become more apparent in the light of the following detailed description of exemplary embodiments thereof, as illustrated in the accompanying drawing.

BRIEF DESCRIPTION OF THE DRAWINGS

The sole FIGURE is a simplified, stylized schematic illustration of an absorption chiller employing the present invention.

MODE(S) FOR CARRYING OUT THE INVENTION

Referring to FIG. 1, a chiller 13 includes a main process chamber 14 in which cool water in a duct 15 is splayed over coils 16 through which warm coolant is pumped from an inlet duct 17, to provide cool coolant in an outlet duct 18 that is used to cool the environment being serviced by the chiller. Because the pressure within the chamber 14 is extremely low, such as on the order of six Torr, the water vapor evaporates as it contacts the coils 16. Within the chamber 14 is a water vapor absorbing fluid, such as an aqueous solution of lithium bromide, which may be on the order of between 60 and 70 weight percent lithium bromide, or water/ammonia mixture, or any other equivalent fluid. The water vapor is absorbed into the lithium bromide solution and is pumped through an outlet duct 21 into a generator 22 where heat is applied from a source 23. Upon heating, the solution in the generator 22 boils, causing water vapor to pass through a duct 25 to a condensing heat exchanger 26 where the water vapor is cooled by external cooling tower water pumped through the heat exchanger 26 from a duct 28. The outlet of the condensing heat exchanger 26 is the cool process water in the duct 15 which is splayed on the coil 16 as described hereinbefore. The highly concentrated lithium bromide solution that remains after water vapor boils off within the generator 22 is pumped through a duct 30 to return to the chamber 14. The apparatus and process as just described, is simplistic, but generally represents a conventional absorption chiller with which the present invention may be utilized.

The present invention takes advantage of the aforementioned formation of hydrogen by the corrosion of the metal parts within the chiller. There is always corrosion at some low level, and therefore, there is always some concentration of hydrogen in the chamber. When air leaks into a chiller, the oxygen accelerates the corrosion process, causing the release of more hydrogen. Although the oxygen of the air is consumed by the corrosion process, the nitrogen is not; the nitrogen impedes the process. The present invention monitors the hydrogen concentration, and determines the occurrence of a leak by noting when the hydrogen concentration begins to increase. In the figure, a hydrogen sensor 33 monitors the ambient in the chamber 14 to determine the hydrogen concentration. When the hydrogen concentration starts to increase, an alert signal may be provided on a line 34 to indicate to maintenance or other interested personnel that a leak has occurred. If necessary, to prevent water from entering the hydrogen sensor, a membrane 35 may be placed along the inlet duct 36. If, on the other hand, the hydrogen sensor can otherwise accommodate the presence of water vapor, then the membrane 35 need not be utilized in any given embodiment of the present invention.

When it is known that a leak has occurred, the location of the leak may be determined according to the invention by spraying necessary areas of the external surface of the chiller with helium from a helium spray 40. Since the internal pressure of the chiller is extremely low, helium will enter the chamber 14 through any leak. The use of helium allows detecting leaks which are between 10 and 1000 times smaller than leaks which are detectable utilizing a Freon spray. The presence of helium is easily detected by means of a typically portable device 42 which includes helium, or a helium/hydrogen leak detector 43. Water vapor entering the vacuum pump that drives the leak detector will cause an increase in the pressure within the leak detector, and thereby invalidate the spectrometry process and destroy the instrument. Water vapor, in accordance with the invention, is prevented from entering the helium/hydrogen leak detector 43. In the first instance, a membrane 44 that will pass helium gas but absolutely block most liquid water and water vapor is utilized in the leak detector inlet duct 45. If necessary, a vapor trap 46, such as a dehumidifying condenser, may be utilized downstream of the membrane, to remove any small amounts of remaining water vapor as the helium passes along the entry duct 45. In most installations, the presence of helium passing through a leak will be detected in about seven to ten seconds after the helium is sprayed at a leak. This makes it quite easy to retrospectively determine the precise location of the leak.

The membranes may be Whatman Model 6722-5001. The vapor trap may be FTS Systems Model SSVT8. The helium detector may be a Leybold Inficon Model UL 200. This detector can also be switched to detect hydrogen. If desired, this detector may be selectively switched (by personnel or automatically) to detect the level of hydrogen in the chiller, thereby to verify efficacy of the hydrogen-removing hot palladium cells 47 (if any are used). The detector 43 will detect an increase of $H_2$ due to leaks or due to a faulty $H_2$ palladium cell 47 not purging the $H_2$ from the chamber 14. The palladium $H_2$-removing cell 47 can be turned off. According to the invention, with the cell on, monitoring the concentration of $H_2$ as a function of time with the detector 43 in the $H_2$ mode, then turning the cell 47 off for a period of time, and again monitoring the change in concentration of $H_2$ as a function of time with the detector 43, will determine if the cell 47 is operating effectively.

The $H_2$ sensor is a low-cost sensor and one may be installed on every chiller; while detector 43 is a relatively expensive system and is used primarily for leak-location purposes. Detector 43 may be a portable system that is readily moved from one chiller to another, as needed.

Thus, although the invention has been shown and described with respect to exemplary embodiments thereof, it should be understood by those skilled in the art that the foregoing and various other changes, omissions and additions may be made therein and thereto, without departing from the spirit and scope of the invention.

I claim:

1. An absorption chiller system with automatic leak detection and which may have leaks therein located quickly, comprising:

an absorption chiller having metal parts and an exterior surface, and containing a water vapor absorbing fluid at pressure well below atmospheric pressure, said fluid, in the presence of air that has leaked into the chiller, corroding said metal parts, which in turn release hydrogen gas;

a hydrogen detector disposed in fluid communication with the interior of said chiller, thereby to provide a measure of the concentration of hydrogen in said interior, an increase in said concentration being indicative of a leak;

a helium sprayer for spraying said external surface with helium; and a helium detector in fluid communication with the interior of said chiller to detect an increase in helium concentration within said chiller, thereby indicating proximity of said sprayer to a leak, said fluid communication including at least one of (a) a membrane that passes light gases but blocks liquid water and water vapor and (b) a water vapor trap.

2. An absorption chiller system with automatic leak detection; comprising:

an absorption chiller having metal parts and containing a water vapor absorbing fluid at pressure well below atmospheric pressure, said fluid, in the presence of air that has leaked into the chiller, corroding said metal parts, which in turn release hydrogen gas; and a hydrogen detector disposed in fluid communication with the interior of said chiller, thereby to provide a measure of the concentration of hydrogen in said interior, an increase in said concentration being indicative of a leak.

3. A chiller system according to claim 2 wherein:

said fluid communication between said hydrogen detector and said interior includes a water vapor elimination device.

4. A chiller system according to claim 3 wherein:

said water vapor elimination device is a membrane that passes hydrogen gas but blocks water vapor.

5. An absorption chiller system which may have leaks therein located quickly, comprising:

an absorption chiller having an external surface and containing a water vapor absorbing fluid at pressure well below atmospheric pressure;

a helium sprayer for spraying said external surface with helium; and a helium detector in fluid communication with the interior of said chiller to detect an increase in helium concentration within said chiller, thereby indicating proximity of said sprayer to a leak, said fluid communication including a water vapor trap downstream of a membrane that passes light gases but blocks liquid water and water vapor.

6. An absorption chiller system which may have leaks therein located quickly, comprising:

an absorption chiller having an external surface and containing a water vapor absorbing fluid at pressure well below atmospheric pressure;

a helium sprayer for spraying said external surface with helium; and a helium detector in fluid communication with the interior of said chiller to detect an increase in helium concentration within said chiller, thereby indicating proximity of said sprayer to a leak, said fluid communication including at least one of (a) a membrane that passes light gases but blocks liquid water and water vapor and (b) a water vapor trap, said helium detector also having a hydrogen detecting mode in which it may be set except when locating a leak by means of said helium spray.

7. A method of leak maintenance for an absorption chiller having metal parts and an external surface, and containing a water vapor absorbing fluid at pressure well below atmospheric pressure, said fluid, in the presence of air that has leaked into the chiller, corroding said metal parts, which in turn release hydrogen gas, comprising:

using a hydrogen detector disposed in fluid communication with said interior to provide a measure of the concentration of hydrogen in said interior, an increase in said concentration being indicative of a leak;

using a helium sprayer for spraying said external surface with helium; and using a helium detector in fluid communication with the interior of said chiller to detect an increase in helium concentration within said chiller, thereby indicating proximity of said sprayer to a leak, said fluid communication including at least one of (a) a membrane that passes light gases but blocks liquid water and water vapor and (b) a water vapor trap.

8. A method of detecting a leak in an absorption chiller having metal parts and containing a water vapor absorbing fluid at pressure well below atmospheric pressure, said fluid, in the presence of air that has leaked into the chiller, corroding said metal parts, which in turn release hydrogen gas, comprising:

using a hydrogen detector disposed in fluid communication with the interior of said chiller, thereby to provide a measure of the concentration of hydrogen in said interior, an increase in said concentration being indicative of a leak.

9. A method of leak maintenance for an absorption chiller having metal parts and an external surface, and containing a water vapor absorbing fluid at pressure well below atmospheric pressure, said fluid, in the presence of air that has leaked into the chiller, corroding said metal parts, which in turn release hydrogen gas, said chiller having at least one selectively operable hydrogen-removing cell in fluid communication with the interior of said chiller, comprising:

using a hydrogen detector disposed in fluid communication with said interior to provide a measure of the concentration of hydrogen in said interior, an increase in said concentration being indicative of a leak;

using a helium sprayer for spraying said external surface with helium;

using a helium detector in fluid communication with the interior of said chiller to detect an increase in helium concentration within said chiller, thereby indicating proximity of said sprayer to a leak, said fluid communication including at least one of (a) a membrane that passes light gases but blocks liquid water and water vapor and (b) a water vapor trap; and (a) periodically, when said at least one cell has been operating, using a hydrogen detector in fluid communication with said interior to record a first measure of the concentration of hydrogen in said interior; (b) then rendering said at least one cell inoperable; (c) and thereafter using said hydrogen detector to record a second measure of the concentration of hydrogen in said interior, the difference between said first and second measures providing an indication of the operative effectiveness of said at least one cell.

10. A method of maintenance for an absorption chiller having metal parts and an external surface, and containing a water vapor absorbing fluid at pressure well below atmospheric pressure, said fluid, in the presence of air that has leaked into the chiller, corroding said metal parts, which in turn release hydrogen gas, said chiller having at least one selectively operable hydrogen-removing cell in fluid communication with the interior of said chiller, comprising:

(a) periodically, when said at least one cell has been operating, using a hydrogen detector in fluid communication with said interior to record a first measure of the concentration of hydrogen in said interior;

(b) then rendering said at least one cell inoperable;

(c) and thereafter using said hydrogen detector to record a second measure of the concentration of hydrogen in said interior, the difference between said first and second measures providing an indication of the operative effectiveness of said at least one cell.

11. A method according to claim 10 wherein:

said step (a) comprises connecting a portable hydrogen detector in fluid communication with said interior.

\* \* \* \* \*